US008733206B2

(12) United States Patent
Hwang et al.

(10) Patent No.: US 8,733,206 B2
(45) Date of Patent: May 27, 2014

(54) SHAFT DAMPER OF TRANSMISSION

(75) Inventors: Jae Woong Hwang, Yongin-si (KR); Yong Wook Jin, Suwon-si (KR); Wan Soo Oh, Yongin-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 13/605,483

(22) Filed: Sep. 6, 2012

(65) Prior Publication Data

US 2013/0118300 A1 May 16, 2013

(30) Foreign Application Priority Data

Nov. 11, 2011 (KR) .................. 10-2011-0117520

(51) Int. Cl.
*F16F 15/16* (2006.01)
(52) U.S. Cl.
USPC ....................................... 74/573.12
(58) Field of Classification Search
USPC ................... 74/572.2, 573.12, 574.4
See application file for complete search history.

(56) References Cited

U.S. PATENT DOCUMENTS

| 4,751,993 | A | * | 6/1988 | Fukushima | ................. | 192/70.17 |
| 4,796,740 | A | * | 1/1989 | Fukushima | ................. | 192/30 V |
| 4,846,323 | A | * | 7/1989 | Fukushima | ................. | 192/30 V |
| 4,856,639 | A | * | 8/1989 | Fukushima | ................. | 192/55.61 |
| 5,695,032 | A | * | 12/1997 | Murata et al. | ................. | 192/48.1 |
| 6,830,140 | B2 | * | 12/2004 | Zink et al. | ................. | 192/48.9 |

\* cited by examiner

*Primary Examiner* — Vicky Johnson
(74) *Attorney, Agent, or Firm* — Morgan, Lewis & Bockius LLP

(57) ABSTRACT

A shaft damper of a transmission is provided to improve an NVH characteristic such as rattle noise of a transmission by effectively reducing target resonance as a problem in whole rpm ranges by adding a structure to minimize one resonance and additionally reduce the resonance with respect the other resonance between two resonances while converting the target resonance as the problem into two divided resonances by mounting a structure which applies inertia to an input shaft or an output shaft, a counter shaft, or a PTO shaft of the transmission.

10 Claims, 4 Drawing Sheets

SHAFT DAMPER OF TRANSMISSION

CROSS-REFERENCE TO RELATED APPLICATION

The present application claims priority of Korean Patent Application Number 10-2011-0117520 filed Nov. 11, 2011, the entire contents of which application is incorporated herein for all purposes by this reference.

BACKGROUND OF INVENTION

1. Field of Invention

The present invention relates to a damper installed on a shaft of a transmission, and more particularly, to a technology that reduces rattle noise of the transmission by avoiding resonance in a specific rpm range by applying additional inertia to an input shaft of the transmission.

2. Background Art

As disclosed in citation lists below, an input shaft damper configured to include an inertia plate is provided on an input shaft of a transmission to effectively avoid resonance in a specific rpm range in which rattle noise of the transmission is problematic without using a dual mass flywheel (DMF).

However, accurate tuning is required to appropriately reduce the resonance in the specific rpm range with the ISD. That is, as illustrated in FIG. 1, when the ISD which is not accurately tuned is applied to the input shaft of the transmission in order to reduce resonance around 1600 RPM, an original first resonance point a is divided into both sides to form a first resonance point a-1 and a second resonance point a-2 and an amplitude of the second resonance point a-2 as one of two divided resonance points decreases to achieve an ISD mounting effect, but the first resonance point a-1, as the other one may be still amplified to a larger amplitude than the first resonance point a as illustrated in FIG. 1.

Accordingly, an appropriate tuning countermeasure should be taken in order to increase inertia by mounting a structure (hereinafter, referred to as shaft damper) such as the ISD on the input shaft or an output shaft, a counter shaft, or a power take off (PTO) shaft of the transmission.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

Various aspects of the present invention provide for a shaft damper of a transmission that can improve an NVH characteristic such as rattle noise of a transmission by effectively reducing target resonance as a problem in whole rpm ranges by adding a structure to minimize one resonance and additionally reduce the resonance with respect the other resonance between two resonances while converting the target resonance as the problem into two divided resonances by mounting a structure which applies inertia to an input shaft or an output shaft, a counter shaft, or a PTO shaft of the transmission.

Various aspects of the present invention provide for a shaft damper of a transmission, including: a shaft rotatably installed in the transmission; a drive plate installed on the shaft with rotation constrained; a first inertia plate installed to be relatively rotatable to the shaft; a first electric member installed to provide elastic force while being elastically transformed by relative rotation between the drive plate and the first inertia plate; a second inertia plate installed to be relatively rotatable to the first inertia plate with the shaft as a rotary shaft; and a second elastic member installed to provide elastic force while being elastically transformed by relative rotation between the first inertia plate and the second inertia plate.

Various aspects of the present invention provide for a shaft damper of a transmission, including: a shaft rotatably installed in the transmission; a first inertia body mounted on the shaft while being elastically relatively rotatable within a specific range with respect to the shaft; and a second inertia body installed to be elastically relatively rotatable with a specific range with respect to the first inertia body with the shaft as a rotary shaft.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
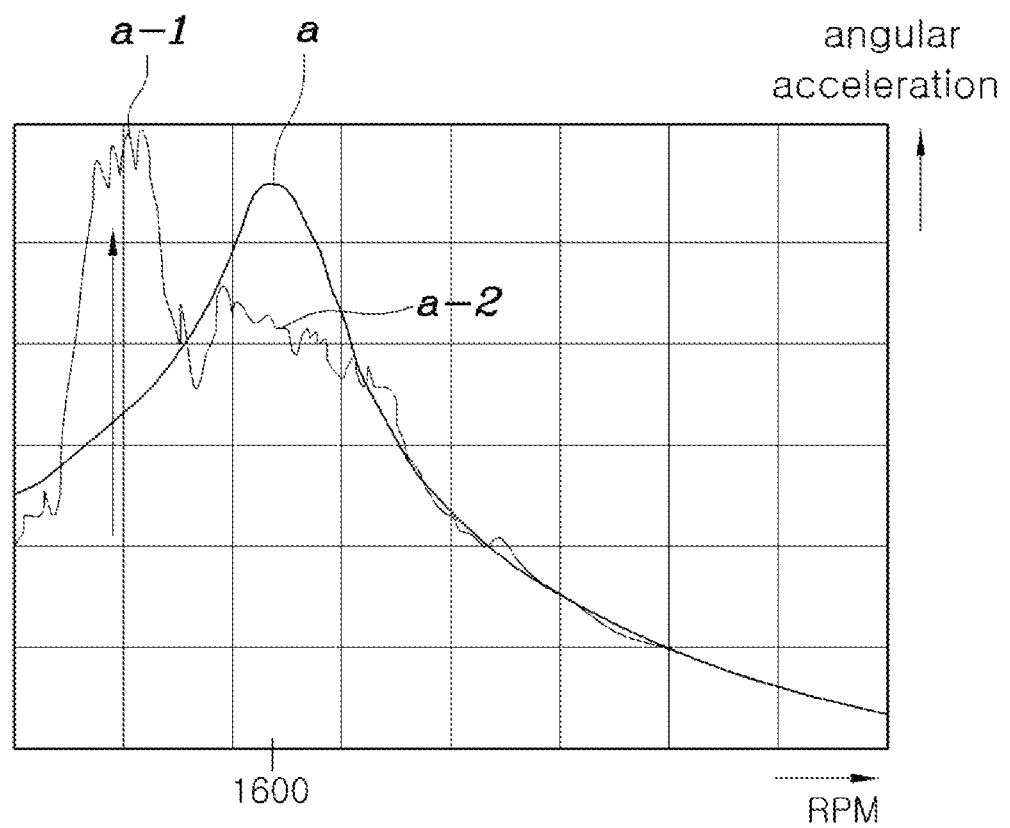
FIG. 1 is a graph illustrating an angular acceleration depending on rpm of an input shaft of a transmission in the related art.

It should be understood that the appended drawings are not necessarily to scale, presenting a somewhat simplified representation of various preferred features illustrative of the basic principles of the invention.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 2:
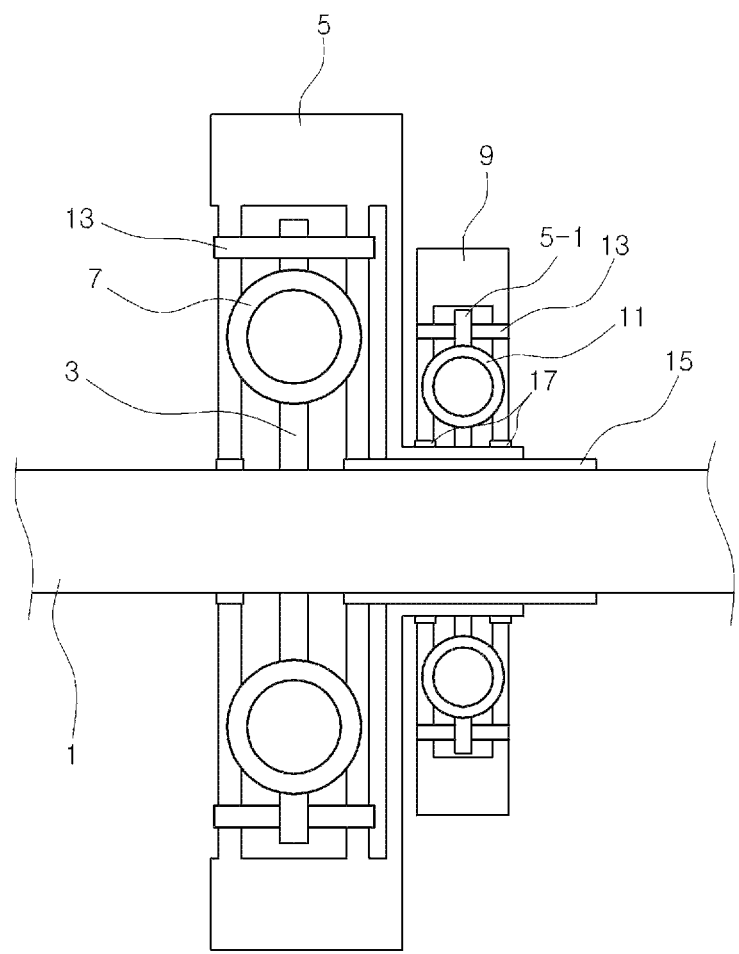
FIG. 2 is a diagram illustrating an exemplary shaft damper of a transmission according to the present invention.
Figure 3:
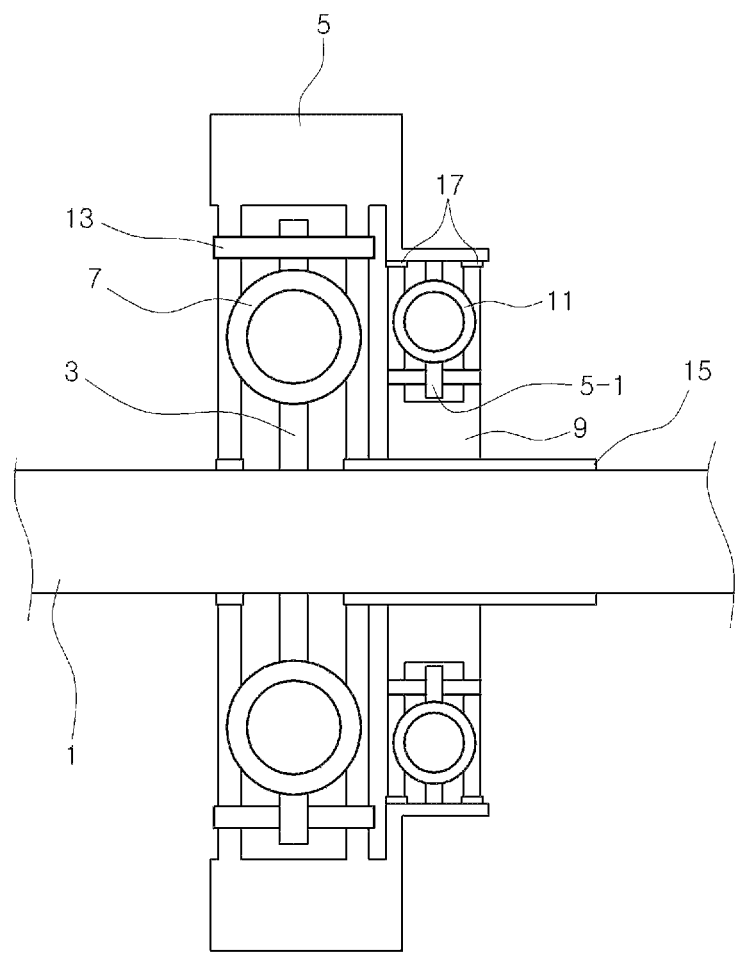
FIG. 3 is a diagram illustrating another exemplary shaft damper of a transmission according to the present invention.

Referring to FIGS. 2 and 3, a shaft damper of a transmission according to various embodiments of the present invention includes a shaft 1 rotatably installed in the transmission, a drive plate 3 installed on the shaft 1 with rotation constrained, a first inertia plate 5 installed on the shaft 1 to be relatively rotatable, a first elastic member 7 installed to provide elastic force while being elastically transformed by relative rotation between the drive plate 3 and the first inertia plate 5, a second inertia plate 9 installed to be relatively rotatable with respect to the first inertia plate 5 with the shaft 1 as a rotational shaft, and a second elastic member 11 installed to provide elastic force while being elastically transformed by relative rotation between the first inertia plate 5 and the second inertia plate 9.

That is, the present invention is a structure which includes the first inertia plate 5 as a first inertia body mounted on the shaft 1 to be elastically relatively rotatable within a specific range with respect to the shaft 1 rotatably installed in the transmission and includes the second inertia plate 9 as a second inertia body installed to be elastically relatively rotatable within a specific range with respect to the first inertia body with the shaft 1 as the rotational shaft, wherein the first inertia plate 5 and the second inertia plate 9 are, elastically in series, connected to the shaft 1 in sequence.

The second inertia plate 9 has relatively smaller rotary inertia than the first inertia plate 5 and the second inertia plate 9 is installed even on the shaft 1 as well as the first inertia plate 5 to be relatively rotatable.

A stopper pin 13 is installed between the drive plate 3 and the first inertia plate 3 to restrain a relative rotating amount therebetween and the stopper pin 13 is installed even between the first inertia plate 5 and the second inertia plate 9 to restrain the relative rotating amount therebeween.

Since a mechanism may be implemented by a mechanism which is the same as or similar as an ISD device in the related art to restrain the relative rotating amounts between the drive plate 3 and the first inertia plate 5 or the first inertia plate 5 and the second inertia plate 9 by installing the stopper pin 13, a detailed description of the mechanism will be omitted.

The illustrated shaft dampers of FIGS. 2 and 3 are the similar as each other in that the first inertia plate 5 is installed while enclosing the drive plate 3 and a driving unit 5-1 for transferring rotary force to and from the second inertia plate 9 is integrally formed in the first inertia plate 5. One will appreciate that in various embodiments, the first and second inertial plates may be monolithically formed.

However, in the embodiment illustrated in FIG. 2, the driving unit 501 extends from the first inertia plate 5 and thereafter, extends outward from a radial-direction inner part of the second inertia plate 9 and the second inertia plate 9 is installed to enclose a radial-direction outer part of the driving unit 5-1.

Herein, the first inertia plate 5 and the driving unit 5-1 are installed to be relatively rotatable to the shaft 1 through a first bearing 15 and the second inertia plate 9 is installed to be relatively rotatable to the driving unit 5-1 through a second bearing 17.

This structure is more advantageous than the illustrated embodiment of FIG. 3 in terms of ensuring the inertia of the second inertia plate 9, and as a result, it is advantageous to increase inertia by a method for easily increasing a diameter of the second inertia plate positioned outside the drive plate 3.

Meanwhile, in the illustrated shaft damper of FIG. 3, the driving unit 5-1 extends from the first inertia plate 5 and thereafter, extends inward from a radial-direction outer part of the second inertia plate 9 and the second inertia plate 9 is installed to enclose a part extending in the radial-direction inner part of the driving unit 5-1.

Herein, the first inertia plate 5 is installed to be relatively rotatable to the shaft 1 through the first bearing 15 and the second inertia plate 9 is installed to be relatively rotatable to the driving unit 5-1 through the second bearing 17 and installed to be relatively rotatable to the shaft 1 through the first bearing 15.

In this structure, it is more difficult to ensure inertia through increasing the size of the second inertia plate 9 by using the driving unit 5-1 than the illustrated shaft damper of FIG. 2, but a shaft-direction width may be relatively small, and as a result, it is more advantageous in mountability.

The shaft damper of the transmission according to the various embodiments of the present invention configured as above may be applied to the input shaft of the transmission and besides, may be installed in various other shafts installed in the transmission, and as a result, for example, the shaft damper is installed even on an output shaft, a counter shaft, or a PTO shaft to show an effect thereof.

Figure 4:
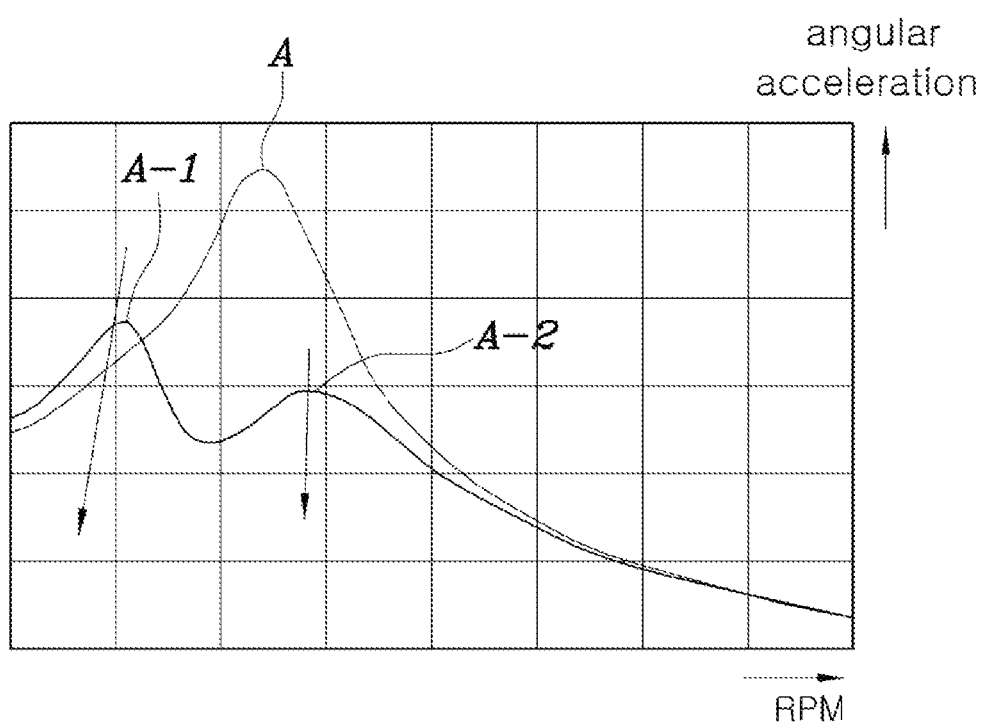
FIG. 4 is a graph of an exemplary angular acceleration depending on rpm of an exemplary input shaft of a transmission, according to the present invention.

FIG. 4 is a graph illustrating the effect which the shaft damper of the transmission according to various embodiments of the present invention shows and illustrates that an initial resonance point A while the shaft damper is not mounted is divided into two resonance points of which amplitudes decrease as the shaft damper is mounted, such as a first resonance point A-1 and a second resonance point A-2.

The first inertia plate 5 is divided into both resonance points to alleviate one resonance point A-2 of two points to an amplitude smaller than the initial resonance point A, but decrease the amplitude thereof even with respect to the other resonance point A-1 which is alleviated more slightly than the initial resonance point A or transformed to the amplitude of the same level or higher by additionally mounting the second inertia plate 9 when alleviation of the other resonance point A-1 is slighter than the initial resonance point A or the other resonance point A-1 is transformed to a state having the same level or the larger amplitude.

Accordingly, the shaft damper of the transmission according to various embodiments of the present invention can significantly improve NVH characteristics of the transmission and a power train including the transmission by actively reducing or alleviating a resonance phenomenon to the minimum which may occur in the transmission.

According to various embodiments of the present invention, an NVH characteristic such as rattle noise of a transmission can be improved by effectively reducing target resonance as a problem in whole rpm ranges by adding a structure to minimize one resonance and additionally reduce the resonance with respect the other resonance between two resonances while converting the target resonance as the problem into two divided resonances by mounting a structure which applies inertia to an input shaft or an output shaft, a counter shaft, or a PTO shaft of the transmission.

For convenience in explanation and accurate definition in the appended claims, the terms upper or lower, front or rear, inside or outside, and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A shaft damper, comprising:
a shaft;
a drive plate fixed to the shaft;
a first inertia plate relatively rotatable to the shaft;
a first elastic member providing elastic force while being elastically transformed by relative rotation between the drive plate and the first inertia plate;
a second inertia plate relatively rotatable to the first inertia plate and the shaft with the shaft as a rotary shaft; and
a second elastic member continuously providing elastic force while being elastically transformed by relative rotation between the first inertia plate and the second inertia plate.

2. The shaft damper of claim 1, wherein:
a stopper pin installed between the drive plate and the first inertia plate to constrain a relative rotating amount therebetween, and
a stopper pin installed between the first inertia plate and the second inertia plate to constrain the relative rotating amount therebetween.

3. The shaft damper of claim 1, wherein the first inertia plate encloses the drive plate and a driving unit for transferring rotary force to and from the second inertia plate is integrally formed on the first inertia plate.

4. The shaft damper of claim 3, wherein the driving unit extends from the first inertia plate and thereafter, extends outward from a radial-direction inner part of the second inertia plate and the second inertia plate encloses a radial-direction outer part of the driving unit.

5. The shaft damper of claim 4, wherein the first inertia plate and the driving unit are relatively rotatable to the shaft through a first bearing and the second inertia plate is relatively rotatable to the driving unit through a second bearing.

6. The shaft damper of claim 3, wherein the driving unit extends from the first inertia plate and thereafter, extends inward from a radial-direction outer part of the second inertia plate and the second inertia plate encloses an inner part of a part which extends in the radial-direction inner part of the driving unit.

7. The shaft damper of claim 6, wherein the first inertia plate is relatively rotatable to the shaft through a first bearing and the second inertia plate is relatively rotatable to the driving unit through a second bearing and relatively rotatable to the shaft through the first bearing.

8. The shaft damper of claim 1, wherein the second inertia plate has smaller inertia than the first inertia plate.

9. A shaft damper for a transmission, comprising:
a shaft;
a first inertia body mounted on the shaft such that the first inertia body is relatively rotatable within a specific range with respect to the shaft wherein rotation of the first inertia body is elastically restricted; and
a second inertia body elastically relatively rotatable with a specific range with respect to the first inertia body and the shaft with the shaft as a rotary shaft, wherein rotation of the second inertia body is elastically restricted.

10. The shaft damper of claim 9, wherein the second inertia body has smaller rotary inertia than the first inertia body and the second inertia body is relatively rotatable to the first inertia body and the shaft.

* * * * *